United States Patent
Schryer

(10) Patent No.: US 9,187,937 B2
(45) Date of Patent: Nov. 17, 2015

(54) COLLAPSIBLE DOOR TRIM PULL HANDLE

(71) Applicant: FORD GLOBAL TECHNOLOGIES, LLC., Dearborn, MI (US)

(72) Inventor: Paul Schryer, Farmington Hills, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 14/073,453

(22) Filed: Nov. 6, 2013

(65) Prior Publication Data

US 2014/0083016 A1 Mar. 27, 2014

Related U.S. Application Data

(62) Division of application No. 13/037,469, filed on Mar. 1, 2011, now abandoned.

(51) Int. Cl.
*E05B 1/00* (2006.01)
*E05B 85/12* (2014.01)
*B60N 3/02* (2006.01)

(52) U.S. Cl.
CPC .............. *E05B 85/12* (2013.01); *B60N 3/026* (2013.01); *E05B 1/0015* (2013.01); *E05B 2001/0023* (2013.01); *Y10T 16/458* (2015.01)

(58) Field of Classification Search
CPC ............. B25G 3/38; B25G 3/28; B25G 3/24; B25G 3/18; B25G 3/16; B25G 3/12; B25G 3/00; B25G 3/32; E06B 3/00; B60J 5/042; B60N 3/026; B60R 2013/0293; B25B 1/00; E05B 85/12; E05B 1/0015; E05B 2001/0023

USPC ................ 49/503; 16/422, 426, 406, 413
See application file for complete search history.

(56) References Cited

U.S. PATENT DOCUMENTS

| | | | | |
|---|---|---|---|---|
| 2,671,625 A * | 3/1954 | Buckley | .......................... | 248/58 |
| 3,066,614 A * | 12/1962 | Perry | .............................. | 417/511 |
| 3,462,179 A * | 8/1969 | Hinkle | ......................... | 403/157 |
| 4,673,625 A * | 6/1987 | McCartney et al. | .......... | 429/187 |
| 4,949,508 A * | 8/1990 | Elton | ............................. | 49/502 |
| 5,232,796 A * | 8/1993 | Baumgartner | ................ | 429/187 |
| 5,720,081 A * | 2/1998 | Aquilina | ......................... | 16/422 |
| 5,933,917 A * | 8/1999 | Lo | ................................. | 16/439 |
| 6,022,638 A * | 2/2000 | Horton et al. | .................. | 429/187 |
| 6,298,775 B1 * | 10/2001 | Chen | ............................... | 99/422 |
| 7,191,493 B2 * | 3/2007 | Vanderpool et al. | ............ | 16/412 |
| 8,443,553 B1 * | 5/2013 | Polewarczyk et al. | .......... | 49/503 |
| 2005/0015933 A1 * | 1/2005 | Hasegawa | ....................... | 16/422 |

* cited by examiner

*Primary Examiner* — Emily Morgan
(74) *Attorney, Agent, or Firm* — LeClairRyan

(57) ABSTRACT

A collapsible vehicle door pull handle comprises two separate pieces joined together by a break away feature. This arrangement allows the pull handle to be strong when the occupant pulls the vehicle door closed, but allows deflection because of the break away feature during a side impact event. The collapsible vehicle door pull handle comprises a handle, a base, an attachment member fitted to one of the handle and the base, and an elastic deformable portion having a keyway for receiving and holding the attachment member with the attachment portion being on the other of the base and the handle. A molded handle might enclose part of the handle or might enclose the entire handle.

16 Claims, 4 Drawing Sheets

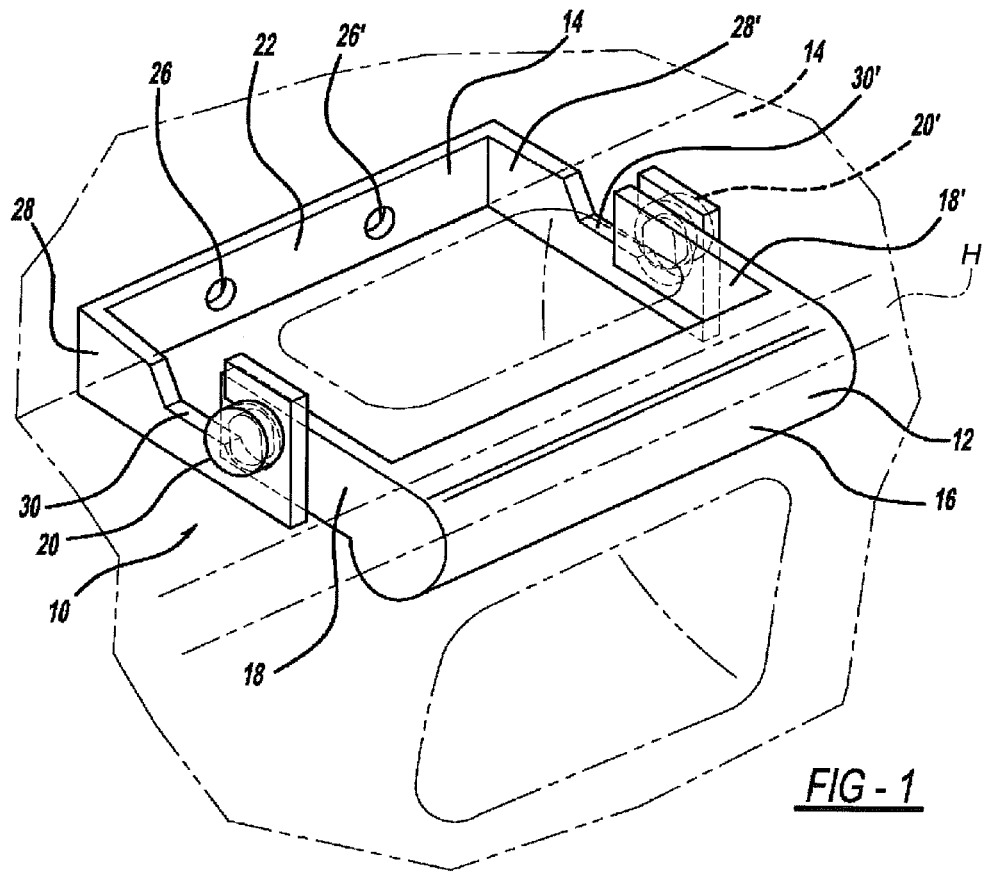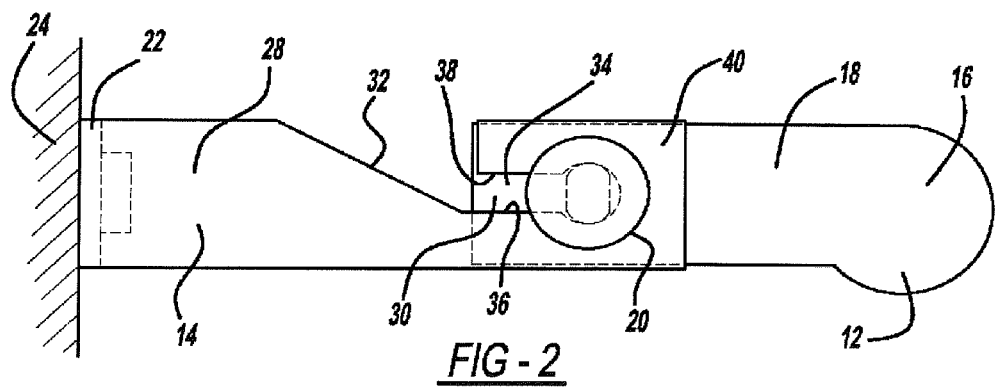

COLLAPSIBLE DOOR TRIM PULL HANDLE

CROSS-REFERENCE TO RELATED

This application is a divisional application of U.S. patent application Ser. No. 13/037,469 (filed on Mar. 1, 2011).

TECHNICAL FIELD

The present invention relates generally to a door trim pull handle for use with a vehicle. More specifically, the present invention relates to a collapsible door trim pull handle which is strong and durable under normal use but which will demonstrate compromised lateral stiffness in the event of a side impact.

BACKGROUND OF THE INVENTION

It is known in vehicles to provide an armrest in a door having an integrated pull handle (also known as a grab handle) to allow the occupant to pull the door shut. The pull handle is designed to withstand tens of thousands of pulls over its working life and, accordingly, must be very strong.

Known pull handles are typically of one-piece design to meet requirements of strength and durability. Door pull handles are designed to meet specific deflection (flexing) requirements during a side impact event to minimize vehicle-inward movement of the handle in a side impact event while at the same time providing to the user a solid feel. Because the position of the pull handle is near the location of the seated occupant, it is somewhat challenging to satisfy the force vs. deflection requirements established for occupant safety while at the same time satisfying requirements of pull strength durability.

Some efforts have been made to overcome the problems of known pull handle designs. The most common solution to improving deflection of the pull handle is to remove structure. This is achieved by forming notches or grooves (devices designed to weaken the part) into the pull handle to initiate flex and fracture. However, this approach weakens the pull handle and adversely affects durability. In addition, the flexing or fracturing itself is difficult to predict and as a result often these features do not behave as predicted, resulting in additional changes late in the program development cycle.

A less complex and more predictable solution to the problems of known pull handle designs is to simply move the pull handle away from the occupant. While improving deflection, this approach negatively affects ergonomics since the handle must be placed too far forward for the comfort of the occupant. In addition, this arrangement may reduce or eliminate package space for window and door controllers.

Accordingly, as in so many areas of vehicle design, there is room for improvement in the art of pull handle construction.

SUMMARY OF THE INVENTION

The disclosed invention provides an alternative arrangement to known vehicle door pull handle designs. The disclosed invention specifically provides a vehicle door pull handle which can deflect a greater amount with less force thereby improving occupant safety without compromising durability.

According to the disclosed invention, two separate pieces are joined together by a break away feature. This arrangement allows the pull handle to be strong when the occupant pulls the vehicle door closed, but allows deflection because of the break away feature during a side impact event.

Particularly, the pull handle of the disclosed invention comprises a handle and a base. The two parts are fitted together by a post on one of the handle or the base and a keyway for receiving and holding the post being formed in the other of the base or the handle. According to this arrangement the handle and the base may be moved toward one another on deformation of the deformable portion during a side impact event.

The attachment member includes a post having a pair of opposed flat surfaces and a pair of opposed curved surfaces. The keyway includes a channel which terminates into a post retaining area. The post retaining area is wider than said channel. The channel is defined by a pair of opposed walls. The post retaining area is defined by a curved wall.

Other advantages and features of the invention will become apparent when viewed in light of the detailed description of the preferred embodiment when taken in conjunction with the attached drawings and the appended claims.

BRIEF DESCRIPTION OF THE DRAWINGS

For a more complete understanding of this invention, reference should now be made to the embodiments illustrated in greater detail in the accompanying drawings and described below by way of examples of the invention wherein:

FIG. 1 illustrates a perspective view of the assembled collapsible door trim pull handle of the disclosed invention enclosed within a door handle;

FIG. 2 illustrates an elevational view of the assembled collapsible door trim pull handle of FIG. 1 illustrated in its attached position to a door inner sheet metal panel;

DETAILED DESCRIPTION OF THE PREFERRED EMBODIMENT

Figure 3:
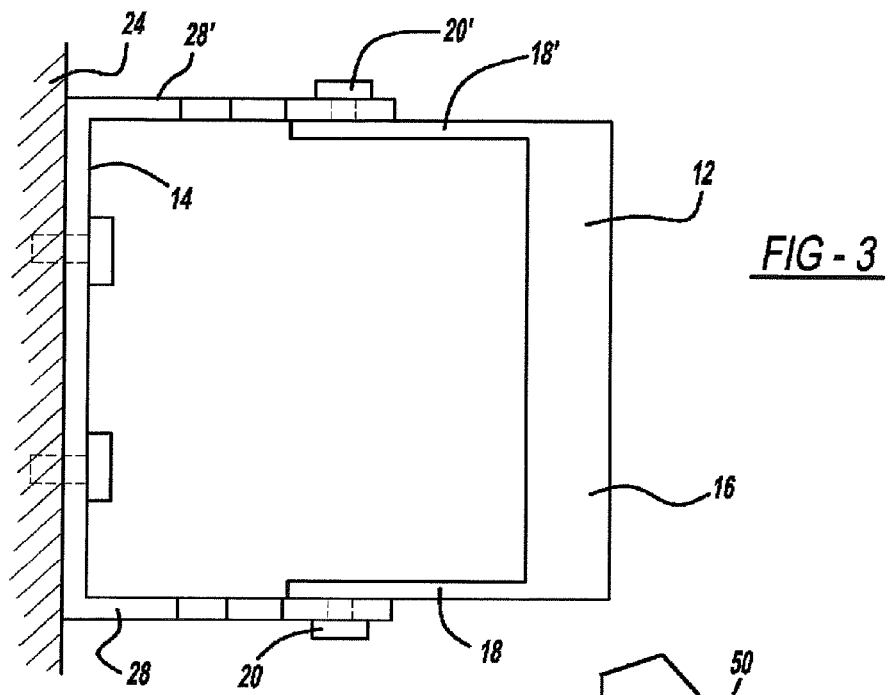
FIG. 3 illustrates a top view showing the assembly of the disclosed invention in its normal assembled position.

In the following figures, the same reference numerals will be used to refer to the same components. In the following description, various operating parameters and components are described for different constructed embodiments. These specific parameters and components are included as examples and are not meant to be limiting.

With reference to FIG. 1, a collapsible door trim pull handle assembly, generally illustrated as 10, is shown in perspective view. The collapsible door trim pull handle assembly 10 is illustrated within a molded handle assembly illustrated as "H". It is to be understood that the shape and configuration of both the collapsible door trim pull handle assembly and the molded handle assembly are for illustrative purposes only and both may be modified without deviating from the invention as disclosed and claimed. In FIG. 2, the collapsible door trim pull handle assembly 10 is shown from a side elevational view. In FIG. 3, a plan view of the assembled collapsible door trim pull handle assembly 10 is shown while in FIG. 4 the collapsible door trim pull handle assembly 10 is shown before assembly.

Referring to FIGS. 1 through 4, the collapsible door trim pull handle assembly 10 comprises a handle assembly 12 and a base assembly 14. The handle assembly 12 and the base assembly 14 are preferably composed of a substantially rigid polymerized material, such as a carbon-reinforced plastic, although a metal could be used as well either alone or in conjunction with one or more plastic components.

The handle assembly 12 comprises a handle bar 16 connecting a first side handle bracket 18 and a second side handle bracket 18'. The first side handle bracket 18 has a first attachment member 20 attached thereto and the second side handle bracket 18' has a second attachment member 20' (shown in shadow lines) attached thereto.

The base assembly 14 comprises an anchoring plate 22 for attachment to a door inner sheet metal panel 24 (shown in FIGS. 2 and 3). Attachment of the anchoring plate 22 to the door inner sheet metal panel 24 may be made by any number of known arrangements, including mechanical fasteners (not shown) fitted through holes 26 and 26'. The anchoring plate 22 connects a first side base bracket 28 and a second side base bracket 28'. The first side base bracket 28 includes a first keyway 30 and the second side base bracket 28' has a second keyway 30'.

It is to be understood that while the disclosed invention is illustrated and discussed herein as having the attachment members 20 and 20' being fitted to the first side handle bracket 18 and the second side handle bracket 18' respectively and as having the keyways 30 and 30' being formed in the first side base bracket 28 and the second side base bracket 28' respectively, this arrangement is not intended as being limiting. As an alternative, the attachment posts could be fitted to the side base brackets and the keyways could be formed in the side handle brackets.

Figure 4:
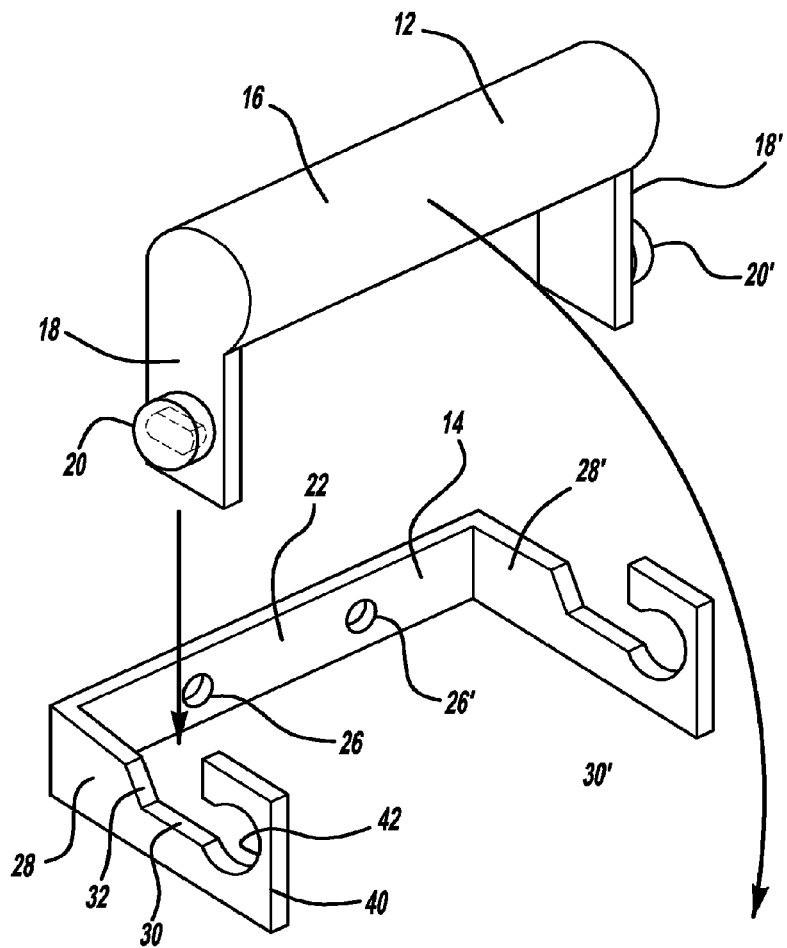
FIG. 4 is a perspective view of the collapsible door trim pull handle shown in FIG. 1 but illustrating the handle spaced apart from the base in pre-assembled alignment.
Figure 7:
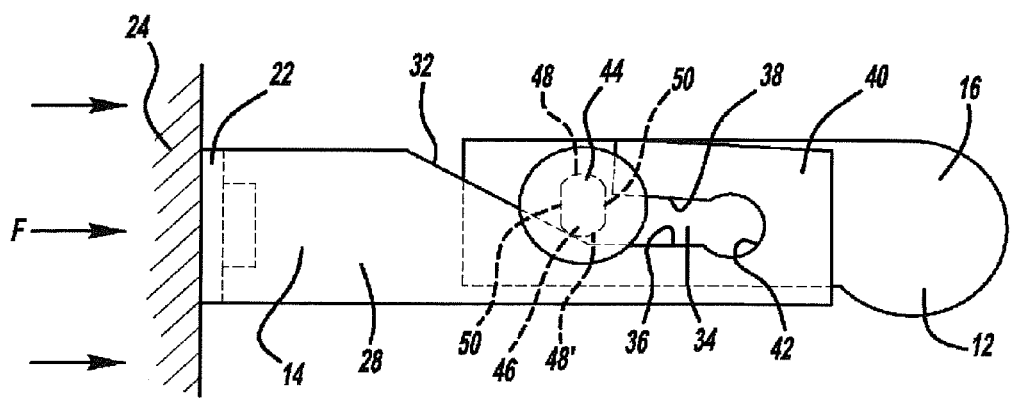
FIG. 7 illustrates the assembly shown in FIG. 2 but after the application of a side impact force.

The keyways 30 and 30' are formed so as to strategically engage the posts (e.g., post 46 in FIGS. 5 and 7) respectively. Particularly, and using the keyway 30 as an example as shown in FIG. 4 and with it being understood that the keyway 30' has the same configuration, the keyway 30 includes a ramped portion 32 and a narrowed portion 34 formed between a first flat surface 36 contiguous with the ramped portion 32 and a second flat surface 38 which is formed at the end of a cantilevered arm 40. The narrowed portion 34 is narrower than a rounded post holding portion 42 defined in part by the cantilevered arm 40.

Figure 5:
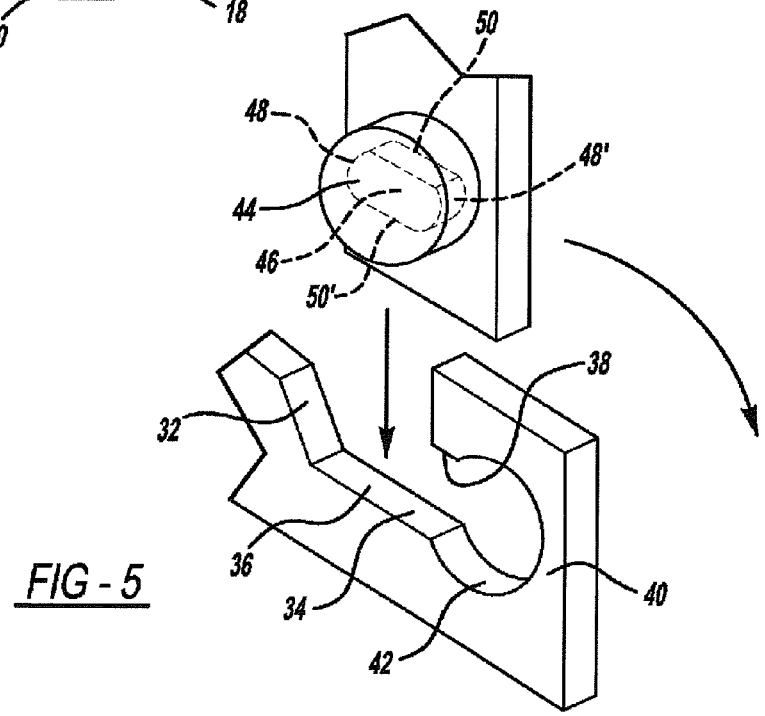
FIG. 5 illustrates a detailed view of the method of attaching the handle to the base by fitting the post of the handle into the keyway of the base.

The keyways 30 and 30' work in conjunction with the attachment members 20 and 20'. Particularly, the attachment members 20 and 20' are constructed so as to cooperate with the keyways 30 and 30' respectively. Using the first attachment member 20 as an example as shown in FIG. 5 and with it being understood that the second attachment member 20' has the same configuration, the attachment member 20 includes a cap 44 and a post 46 (shown in broken lines in FIG. 5). The post 46 has two opposed flat surfaces 50 and 50' and two opposed curved surfaces 48 and 48'. The two opposed flat surfaces 50 and 50' define a width that is narrow enough to pass between the first flat surface 36 and the second flat surface 38 of the narrowed portion 34. However, the two opposed curved surfaces 48 and 48' define a width that is wider than the space defined between the first flat surface 36 and the second flat surface 38. The two opposed flat surfaces 50 and 50' are perpendicular to the long axes of the first side handle bracket 18 and a second side handle bracket 18' respectively.

Accordingly, to attach the handle assembly 12 to the base assembly 14 the installer first rotates the handle assembly 12 to about a 90° angle relative to the base assembly 14. In this position the two opposed flat surfaces 50 and 50' are in alignment with the first flat surface 36 and the second flat surface 38 of the narrowed portion 34. Thus positioned, the installer can pass the post 46 through the narrowed portion 34 and into the rounded post holding portion 42. Once so positioned, the installer can rotate the handle assembly 12 such that the first side handle bracket 18 and the second side handle bracket 18' are in axial alignment with the first side base bracket 28 and the second side base bracket 28', thus locking the handle assembly 12 with the base assembly 14.

Figure 6:
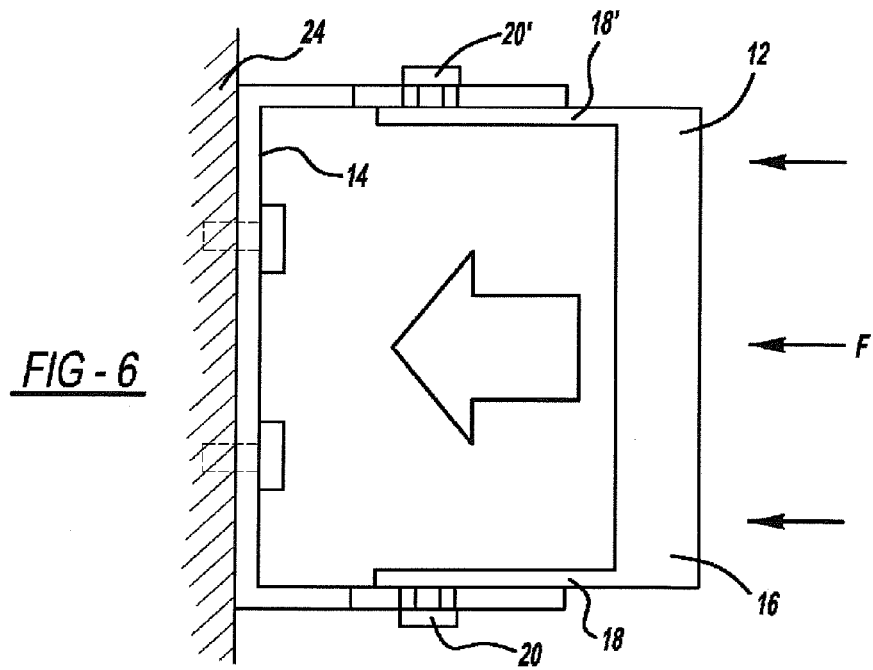
FIG. 6 illustrates the assembly shown in FIG. 3 but collapsed after the application of a side impact force.

During the course of its life, a door trim pull handle is designed to withstand tens of thousands of pulls with the maximum pull force being hundreds of Newtons. Conversely, during a side impact event the maximum force on the door trim pull handle needs to be much less than the hundreds of Newtons of the maximum pull force. The disclosed and described invention allows the handle to collapse, keeping force upon the occupant low. Particularly, when the vehicle occupant pulls on the collapsible door trim pull handle assembly 10 when closing the vehicle door (not shown), the handle assembly 12 and the base assembly 14 function as an integral component thus allowing the occupant to apply considerable force to the pull handle assembly. However, in the event of a side impact, the arrangement of the disclosed invention minimizes the impact of the collapsible door trim pull handle assembly 10 upon the occupant because of its ability to collapse. This situation is particularly shown in FIGS. 6 and 7 in which a force has been applied to the collapsible door trim pull handle assembly 10 via the vehicle door (not shown). As the collapsible door trim pull handle assembly 10 moves vehicle inward toward the occupant (not shown), the handle assembly 12 impacts the occupant but the vehicle-inward movement of the handle assembly 12 is halted upon initial impact even as the base assembly 14 continues its vehicle-inward movement. This result is due to the designed-in and allowed deformation of the cantilevered arm 40 when the attachment member 20 is pushed against it with the vehicle-inward movement of the base assembly 14. Because of the relatively narrow construction of the cantilevered arm 40, deformation of the cantilevered arm 40 occurs before deformation of the post 46. Additional deformation mechanisms may be provided to the cantilevered arm 40, such as a weakened, thinned, or notched construction.

The foregoing discussion discloses and describes exemplary embodiments of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A vehicle door assembly comprising:
an inner sheet metal panel positioned within a vehicle door;
a base assembly comprising an anchoring plate attached to the inner sheet metal panel and a first side base bracket and a second side base bracket extending from the anchoring plate;
a handle assembly comprising a handle bar and a first handle bracket and a second handle bracket extending from the handle bar, wherein the first side base bracket is slidably connected to the first handle bracket by a first post in a first keyway and the second side bracket is slidably connected to the second handle bracket by a second post in a second keyway, at least one of said keyways including a deformable cantilevered element; and a molded handle assembly that enclosed the base assembly and the handle assembly that is attached to the vehicle door.

2. The vehicle door assembly of claim 1 wherein each post includes a pair of opposed flat surfaces.

3. The vehicle door assembly of claim 2 wherein each post has a pair of opposed curved surfaces.

4. The vehicle door assembly of claim 2 wherein each keyway includes a channel which terminates into a post retaining area that is wider than said channel.

5. The vehicle door assembly of claim 4 wherein said channel is defined by a pair of opposed walls.

6. The vehicle door assembly of claim 1 wherein said post retaining area is defined by a curved wall.

7. A vehicle door assembly attached to a vehicle comprising:
- an inner sheet metal panel positioned within a vehicle door, the inner sheet metal panel having a surface configured to face an interior of a vehicle;
- a base assembly comprising an anchoring plate attached to the surface of the inner sheet metal panel and a plurality of side base brackets extending from the anchoring plate, each side base bracket of the plurality including a respective keyway, said respective keyway being partially defined by a deformable cantilevered element;
- a handle assembly comprising a handle bar and a plurality of handle brackets extending from the handle bar, each handle bracket of the plurality including a respective post, wherein each said base bracket of the plurality of side base brackets is connected to a respective handle bracket included amount the plurality of handle brackets by a respective post slidably inserted through a respective keyway; and
- a molded interior-trim handle that encloses the handle assembly and that comprises a portion of an interior trim of the vehicle door.

8. The vehicle door assembly of claim 7, wherein the respective post has a pair of opposed surfaces.

9. The vehicle door assembly of claim 8, wherein the respective post has a pair of opposed curved surfaces.

10. The vehicle door assembly of claim 7, wherein the respective keyway includes a channel which terminates into a post retaining area that is wider than said channel.

11. The vehicle door assembly of claim 10, wherein said channel is defined by a pair of opposed walls.

12. The vehicle door assembly of claim 11, wherein said post retaining area is defined by a curved wall.

13. A door trim pull handle that is coupled to a vehicle door and that is configured to face towards an interior of a vehicle, the door trim pull handle comprising:
- a base assembly comprising an anchoring plate, which is attached to an inner sheet metal panel positioned within the vehicle door, and a first side base bracket and a second side base bracket extending from the anchoring plate, wherein the first side base bracket includes a first keyway that is at least partially defined by a first cantilevered arm and the second side bracket includes a second keyway that is at least partially defined by a second cantilevered arm, and wherein at least one of said cantilevered arms is deformable;
- a handle assembly comprising a handle bar and a first handle bracket and a second handle bracket extending from the handle bar, wherein the first handle bracket includes a first post and the second handle bracket include a second post, and wherein the first post is slidably received in the first keyway and the second post is slidably received in the second keyway; and
- a molded interior trim handle that encloses the handle assembly and that comprises a portion of an interior trim of the vehicle door.

14. The door trim pull handle of claim 13, wherein each keyway includes channel and an area for retaining said post that is wider than said channel, and wherein the respective portion at least partially defines the channel.

15. The door trim pull handle of claim 14, wherein each post includes a pair of opposed walls that are narrow enough to pass through said channel.

16. The door trim pull handle of claim 14, wherein each post includes a pair of opposed walls that are too wide to pass through said channel.

* * * * *